United States Patent
Shimojoh

(10) Patent No.: US 6,417,960 B1
(45) Date of Patent: Jul. 9, 2002

(54) METHOD OF EQUALIZING GAIN UTILIZING ASYMMETRICAL LOSS-WAVELENGTH CHARACTERISTICS AND OPTICAL AMPLIFYING APPARATUS USING SAME

(75) Inventor: Naomasa Shimojoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/576,419

(22) Filed: May 22, 2000

(30) Foreign Application Priority Data

Jun. 11, 1999 (JP) .......................................... 11-165481

(51) Int. Cl.$^7$ .............................................. H04B 10/12

(52) U.S. Cl. ............................. 359/337.2; 359/341.41; 359/341.42

(58) Field of Search ........................ 359/337.1, 337.11, 359/341.41, 341.42, 337.2, 337.21

(56) References Cited

U.S. PATENT DOCUMENTS

| | | | | |
|---|---|---|---|---|
| 5,497,264 A | * | 3/1996 | Bayart | 359/337 |
| 5,517,351 A | * | 5/1996 | Hatakeyama | 359/341 |
| 5,530,584 A | * | 6/1996 | Myslinski | 359/341 |
| 5,636,301 A | * | 6/1997 | O'Sullivan | 385/24 |
| 5,861,981 A | * | 1/1999 | Jabr | 359/341 |
| 5,867,306 A | * | 2/1999 | Isshiki | 359/341 |
| 5,963,361 A | * | 10/1999 | Taylor | 359/337 |
| 6,034,812 A | * | 3/2000 | Naito | 359/341 |
| 6,055,348 A | * | 4/2000 | Jin | 385/37 |
| 6,097,535 A | * | 8/2000 | Terahara | 359/341 |
| 6,204,958 B1 | * | 3/2001 | Taylor | 359/337 |
| 6,222,655 B1 | * | 4/2001 | Terahara | 359/124 |

OTHER PUBLICATIONS

Terahara, T. et al. "0.7 bit/s (66 × 10.66 GBit/s) WDM transmission over 2212 km using broadband, high–power EDFAs with pump reflector." Elect. Lett, May 14, 1998, vol. 34, No. 10, pp. 1001–1002.*

Naito, T. et al. "Long Haul WDM Transmission System by Use of High Alumina Codoped EDFAs and Gain–Equalizers." Global Telecommunications Conference, 1998. Globecom 1998. The Bridge to Global Integration. 1998 IEEE. pp 992–997.*

Vengsarkar, A. "Long–Period Fiber Gratings." OFC 1996. pp 269–270.*

Sun. Y, et al. "A Gain–Flattened Ultra Wide Band EDFA for High Capacity WDM Optical Communication Systems." ECOC 1998, Sep. 1998. pp 53–54.*

Davis, D.D. et al. "Long–Period fibre grating fabrication with fcused CO2 laser pulses." Elect. Lett. Feb. 5, 1998. vol. 34, No. 3. pp 302–303.*

Terahara, T. et al. "85 Gbit/s WDM transmission of 16 5.3 Gbit/s RZ data signals over 7931 km using accurate gain–equalisation and pre–compensation of group–velocity–dispersion." Elect. Lett. Mar. 27, 1997.*

Naito, T. et al 20–nm signal bandwidth after 147–amplifier chain using long–period gain–equalizers.*

(List continued on next page.)

Primary Examiner—Thomas H. Tarcza
Assistant Examiner—Andrew R. Sommer
(74) Attorney, Agent, or Firm—Staas & Halsey, LLP

(57) ABSTRACT

A device for equalizing the gain-wavelength characteristics of an optical repeater used in a long distance optical transmission system, wherein the gain-wavelength characteristics are equalized by one optical filter having asymmetrical loss-wavelength characteristics in a desired wavelength range order to flatten the gain-wavelength characteristics curve over a wide wavelength range. Since such a device can equalize the gain by one optical filter, adjustment the would normally be required between plural optical filters is unnecessary, so that it is simple and cost effective.

16 Claims, 13 Drawing Sheets

OTHER PUBLICATIONS

Sun, Y. et al. "Transmission of 32–WDM 10 Gb/s Channels Over 640 km Using Broad–band, Gain–Flattened Erbium –Doped Silica Fiber Amplifiers." IEEE Photonics Tech Lett vol. 9, No. 12, Dec. 1997.*

Wysocki, P. F. et al. "Broad–Band Erbium–Doped Fiber Amplifier Flattened Beyond 40 nm Using Long–Period Grating Filter." IEEE Photonics Tech Lett. vol. 9, No. 10, Oct. 1997. pp 1343–1345.

Naito, T. et al. "128–Gbit/s WDM transmission of 24 5.3–Gbit/s RZ signals over 7828 km using gain equalization to compensate for asymmetry in EDFA gain characteristics." OFC '97 Tech. Digest. pp 45–46.

Riant, I. et al. "Gain equalization with optimized slanted Bragg grating on adapted fibre for multichannel long–haul submarine transmission." OFC/IOOC '99. Technical Digest, 1999. pp. ThJ6–1–147–149.

The Institute of Electronics Information and Communication Engineers, TEchnical Report of IEICE OPE 98–III Dec. 1998, pp. 13–18.

Patent Abstracts of Japan of Publication No. 06276154, Sep. 30, 1994.

Patent Abstracts of Japan of Publication No. 3–44206, Feb. 26, 1991.

Patent Abstracts of Japan of Publication No. 4–147114, May 20, 1992.

Patent Abstracts of Japan of Publication No. 09191303, Jul. 22, 1997.

Patents Abstracts of Japan of Publication No. 09244079, Sep. 19, 1997.

Patent Abstracts of Japan of Publication No. 10285113, Oct. 23, 1998.

Patent Abstracts of Japan of Publication No. 08240822 A, Sep. 17, 1995.

Patent Abstracts of Japan of Publication No. 07283786 A, Oct. 27, 1995.

Patent Abstracts of Japan of Publication No. 11046467, Feb. 16, 1999.

Patent Abstracts of Japan of Publication No. 10154840, Jun. 9, 1998.

* cited by examiner

METHOD OF EQUALIZING GAIN UTILIZING ASYMMETRICAL LOSS-WAVELENGTH CHARACTERISTICS AND OPTICAL AMPLIFYING APPARATUS USING SAME

BACKGROUND OF THE INVENTION

1. Field of the Invention

The present invention relates to an optical communication device for equalizing the gain-wavelength characteristics of an optical amplifier/repeater device used in a long-distance optical transmission systems. More particularly, the present invention relates to an optical equalizer for equalizing the gain-wavelength characteristics by an optical filter having asymmetrical loss-wavelength characteristics in a given wavelength range. Further, the invention relates to an optical amplifying apparatus and optical transmission system equipped with such an optical equalizer.

Ultra-long distance and large-capacity optical communication apparatuses are typically required when constructing multimedia networks. Concentrated studies are now being made of the wavelength-division multiplexing (or WDM) as a method for realizing large-capacity apparatuses in view of their advantages, namely that such multiplexing can effectively utilize a wide bandwidth and a large capacity of an optical fiber.

In ultra-long distance optical transmission systems such as transoceanic submarine cables, WDM optical signals are attenuated during transmission over ultra-long distances making it necessary to relay and amplify the WDM optical signals. A conventional repeater, having three functions of retiming, reshaping, and regeneration, have also been proposed for this purpose. However, since the optical fiber amplifier has advantages of not being dependent on the transmission speed, is capable of simplifying repeaters, and is capable of amplifying WDM optical signals as they are, the use of optical fiber amplifiers has been investigated and developed actively.

In cases where WDM optical signals are relayed and amplified by over tens of repeaters, gain-wavelength characteristics according to the amplified wavelength range are in a non-flat curve because the gains of the optical amplifiers in the repeaters differ slightly for every wavelength. Because these gain-wavelength characteristics in a non-flat curve, a deviation occurs in the optical signal/noise ratios (optical SNR) for individual wavelengths. If the deviation occurs in the optical SNR, the optical signals of low optical SNR is further deteriorated in its optical SNR while being relayed through multiple stages. For this reason, in order to reduce the gain deviation between the WDM optical signals to within a given range tolerated by the optical transmission system, it is necessary to secure a wavelength range where the gain-wavelength characteristic curve is flat.

2. Description of the Related Art

Because of the above, optical amplifiers used in repeaters and optical equalizers for flattening the gain-wavelength characteristic curve in 1550-nm wavelength range have been developed.

As shown in FIG. 13, an optical amplifier has gain-wavelength characteristics as indicated by the chain double-dashed line. If an optical filter having loss-wavelength characteristics of the same profile as the profile of the gain-wavelength characteristics (i.e., gain-wavelength characteristics opposite in profile to the gain-wavelength characteristics of the optical amplifier) can be used as an optical equalizer, then a flat gain-wavelength characteristic curve can be obtained in the 1550-nm wavelength range.

The horizontal axis of FIG. 13 indicates wavelength given in nm. The left vertical axis indicates gain in dB. The right vertical axis indicates loss in dB. The curve indicated by the chain double-dashed line indicates the gain-wavelength characteristics of the optical amplifier. The curve indicated by the dotted line indicates the loss-wavelength characteristics of an optical equalizer.

It is to be noted, however, as shown in the chain double-dotted line, that the gain-wavelength characteristics of the optical amplifier in the 1550-nm wavelength range are asymmetrical with respect to a wavelength at which the gain gives its maximal value.

The term asymmetry means that where a curve indicating the gain-wavelength characteristics is bent back about a wavelength giving a maximal value, a curve portion indicating the gain-wavelength characteristics at the shorter wavelength side and a curve portion indicating the gain-wavelength characteristics at the longer wavelength side do not overlapped.

Since the gain-wavelength characteristics have asymmetry in Japanese Patent Laid-Open No. 244079/1997, owing to the fact that an arbitrary curve can be decomposed into periodic functions because of the principle of Fourier transformation, by combining several periodic optical filters having different free spectra ranges (FSRs), an optical filter having loss-wavelength characteristics of a profile substantially identical with that of the gain-wavelength characteristics is created and the created optical filter is used as an optical equalizer.

When such several optical filters are combined, in one free spectra range (FSR) extending from one wavelength of the loss-wavelength characteristics of the optical filter that gives a certain maximum loss (minimum loss) to a wavelength giving a next maximum loss (minimum loss), that portion of the loss-wavelength characteristics which is symmetrical with respect to the wavelength giving a minimum loss (maximum loss) is utilized.

In this way, in the past, a symmetrical portion of the loss-wavelength characteristics has been utilized in order to flatten the gain-wavelength characteristic curve and, further, an optical equalizer composed of plural optical filters has been employed.

SUMMARY OF THE INVENTION

It is an aspect of the present invention to provide a method for flattening the curve of the intensity of input light over a wide range of wavelengths.

It is another aspect of the invention to provide an optical equalizer capable of flattening the curve of the intensity of input light over a wide range of wavelengths.

It is a further aspect of the invention to provide an optical amplifying apparatus capable of amplifying light over a desired wavelength range and having gain-wavelength characteristics with a flat curve over a wide range of wavelengths.

It is a yet other aspect of the invention to provide an optical transmission system capable of equalizing gain deviations coming from the loss-wavelength characteristics of an optical transmission path and from the gain-wavelength characteristics of an optical amplifier.

The above-described aspects are achieved by using, as a part to equalize gain, one optical filter utilizing the asymmetrical loss-wavelength characteristics of wavelengths. For example, in the loss-wavelength characteristics of a fiber grating filter, such an asymmetrical loss-wavelength characteristic is on the shorter wavelengths side with respect to a wavelength giving the first-order maximal value. This could also apply for the loss-wavelength characteristics on the longer wavelength side. Since the gain can be equalized by one optical filter with such a gain-equalizing part, adjustments between optical filters which are normally required in cases where gain is equalized by plural optical filters are unnecessary. Hence, simple and cost-effective optical equalizers, optical amplifying apparatus, and optical transmission systems can be provided.

It is noted that the further objects and characteristics of the present invention will be clearly shown in the following explanation described based on the accompanying drawings.

BRIEF DESCRIPTION OF THE DRAWINGS

The nature, the principle, and utility of the invention will become apparent from the following detailed description when read in conjunction with the accompanying drawings in which like parts are designated by identical reference numbers, in which.

DETAILED DESCRIPTION OF THE PREFERRED EMBODIMENTS

Figure 1:
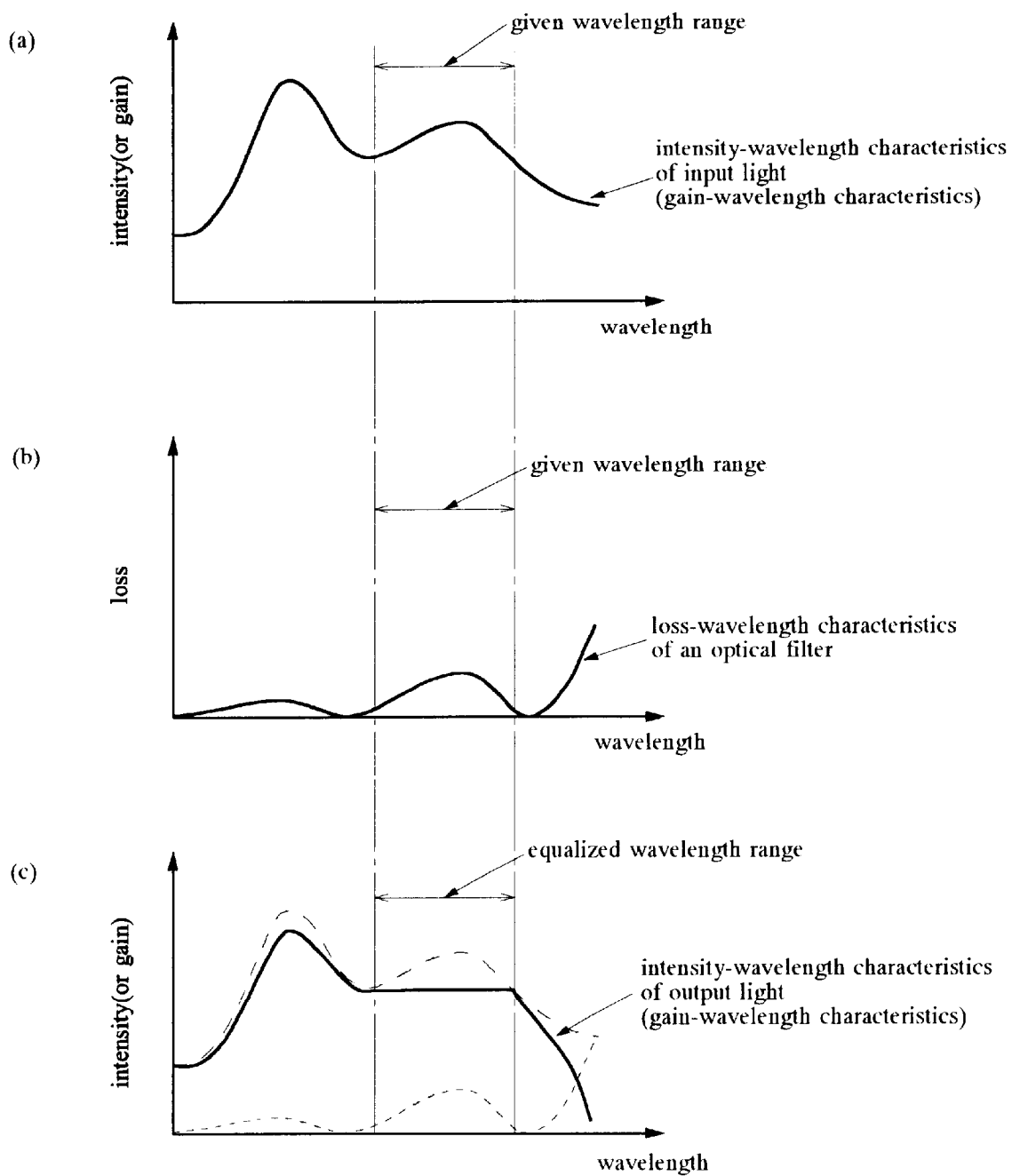
FIG. 1(a) is a diagram showing the light intensity-wavelength characteristics of input light.
FIG. 1(b) is a diagram showing the loss-wavelength characteristics of the optical filter.
FIG. 1(c) is a diagram showing the light intensity-wavelength characteristics of output light.

Embodiments of the invention will be described with reference to the accompanying drawings. In these Figures, the same constructions are designated by the same reference numerals, and their repeated description may be omitted.

In a gain equalization method in accordance with a first embodiment of the invention, a portion of the loss-wavelength characteristics of an optical filter, which is asymmetrical with respect to a wavelength giving a peak value of loss, is used. The wavelength giving the peak value of loss is brought nearly into coincidence with a wavelength that gives a peak value within a given wavelength range contained in light intensity-wavelength characteristics. The result is the input light is emitted by making its light intensity-wavelength characteristic curve substantially flat in the given wavelength range.

In the first embodiment, the peak value of loss may be a maximal value, and the peak value within the given wavelength range of the light intensity-wavelength characteristics may be a maximal value.

In the first embodiment, the peak value of loss may be a peak value on the shorter side of the wavelength giving the first-order peak value of loss, and the peak value within the given wavelength range of the light intensity-wavelength characteristics may be a maximal value. This optical filter may be a fiber grating filter.

In the first embodiment, the peak value of loss may be a peak value on the longer side of the wavelength giving the first-order peak value of loss, and the peak value within the given wavelength range of the light intensity-wavelength characteristics may be a maximal value. This optical filter may be a fiber grating filter.

On the other hand, an optical equalizer in accordance with the first embodiment can comprise an optical filter which has a maximal value of loss within a given wavelength range and whose loss wavelength characteristics are asymmetrical with respect to a wavelength giving this maximal value of loss, and which is an optical equalizer for bringing the wavelength giving the maximal value of loss within the given wavelength range nearly into coincidence with the wavelength giving the maximal value in the gain-wavelength characteristics of the optical amplifying apparatus.

Further, the gain equalization method in accordance with the first embodiment can be applied to the following optical amplifying apparatus. Such an optical amplifying apparatus can comprise an optical amplifier for amplifying the light in a given wavelength range and an optical filter having a maximal value of loss within the given wavelength range and being asymmetrical with respect to a wavelength giving the aforementioned maximal value of loss, and by bringing the wavelength giving the maximal value of loss within the given wavelength range nearly into coincidence with the wavelength giving the maximal value within the gain-wavelength characteristics of the optical amplifier.

In such an optical amplifier, the optical filter may be a fiber grating filter in which a part in the loss-wavelength characteristics of the shorter side with respect to the wavelength giving a first-order maximal value of loss is set to the given wavelength range.

In such an optical amplifier, the optical filter may be a fiber grating filter in which a part in the loss-wavelength characteristics of the longer side with respect to the wavelength giving a first-order maximal value of loss is set to the given wavelength range.

The above described optical amplifying apparatus may be further equipped with a level control portion for controlling the intensity of output light from the optical amplifier according to the intensity of the output light.

The above described optical amplifying apparatus may be further equipped with a gain control portion for constantly controlling the gain of the optical amplifier according to intensity of input light and intensity of output light.

Further, as an example of the optical amplifier in the optical amplifying apparatus, the optical amplifier can comprise an optical fiber doped with a rare earth element and a pump source for generating pump light for exciting the optical fiber.

Such an optical amplifier may be further equipped with a reflection-type optical filter connected to the end of the optical fiber that is opposite to the end on which light from the pump source is inputted. The reflection-type optical filter has a reflection range that is set to the wavelength of the pump light.

Further, in such an optical amplifier, the pump source may be a redundantly structured pump source having plural light sources and a combining portion for combining beams and maintaining polarization from the plural light sources and then supplying the resultant light to the optical fiber.

Further, in such an optical amplifier, the pump source may be a redundantly configured pump source having plural light sources and a multiplexing portion for wavelength-multiplexing light rays from the plural light sources and supplying the resultant light to the optical fiber.

Additionally, in an optical transmission system comprising an optical transmission path for transmitting light, an optical amplifying apparatus for amplifying the light transmitted through the optical transmission path, and an optical equalizer inserted in any location within the optical transmission path and connected, the aforementioned optical equalizer can be used.

In an optical transmission system having an optical transmission path for transmitting light and the optical amplifying apparatus for amplifying the light transmitted through the optical transmission path, the aforementioned optical amplifying apparatus can be used.

The principle of the first embodiment is described by referring to FIG. 1.

In the present invention, output light having an almost flat light intensity-wavelength characteristic curve is obtained by using an optical filter having loss-wavelength characteristics of a profile substantially identical with that of the input light intensity-wavelength characteristics.

The input light intensity-wavelength characteristics have one maximal value of gain in a given wavelength range as shown in FIG. 1(a), and are asymmetrical with respect to the wavelength giving the maximal value of gain. Such a profile of intensity-wavelength characteristics is generally observed in an erbium-doped fiber amplifier, for example, and disclosed in "Optical Amplifier and its Applications", supervised by Hideki Ishio, pp. 115–116, Ohmsha, Ltd., Japan.

Where the input light described above occurs, an optical filter having loss-wavelength characteristics of a profile substantially identical with that of input light intensity-wavelength characteristics in a given wavelength range as shown in FIG. 1(b) is used. For example, this profile is present in a part of the loss-wavelength characteristics of a fiber Bragg grating filter (FBG).

Plotted on the horizontal axes of FIGS. 1(a)–1(c) is wavelength. Plotted on the vertical axes of FIGS. 1(a) and 1(c) is intensity, or gain. Plotted on the vertical axis of FIG. 1(b) is loss. Where light inputted to an optical equalizer is light outputted from an optical amplifier, the intensity-wavelength characteristics mean gain-wavelength characteristics.

Figure 2:
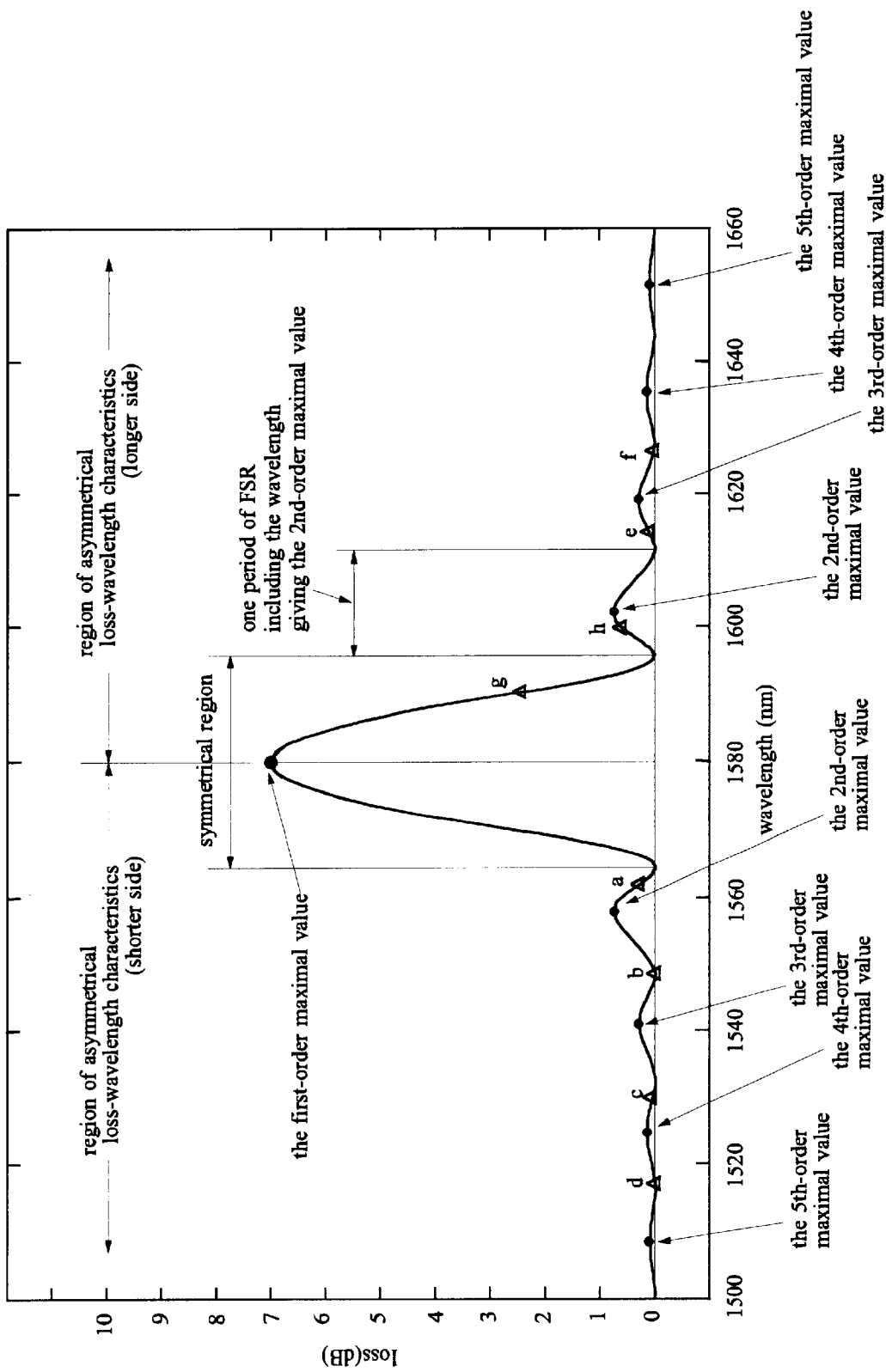
FIG. 2 is a diagram showing one example of loss-wavelength characteristics of a long-period fiber grating filter.

As shown in FIG. 2, a loss-wavelength characteristic curve of a fiber Bragg grating filter (FBG) has a plurality of peak values. The loss-wavelength characteristic curve of a fiber Bragg grating filter is symmetrical with respect to the wavelength giving the largest value of the plurality of peak values. But the loss-wavelength characteristic curve of a fiber Bragg grating filter (FBG) is asymmetrical with respect to each wavelength giving a peak value of the plurality of peak values other than the aforementioned largest value.

In the loss-wavelength characteristics of the fiber Bragg grating filter (FBG), the maximal value giving the greatest loss shown in FIG. 2 is referred to as the first-order maximal value. That is, the first-order maximal value is a greatest value of loss. Further, a maximal value giving the next greatest loss is referred to as the second-order maximal value. In addition, a maximal value giving the third greatest value of loss is referred to as the third-order maximal value. Subsequently, the fourth and fifth order maximal values and so on are defined similarly.

With respect to the loss-wavelength characteristics shown in FIG. 2, in one period of free spectra range (FSR) included in the wavelength giving the first-order maximal value, the loss-wavelength characteristics are a region symmetrical with respect to the wavelength giving the first-order maximal value. On the other hand, with respect to the loss-wavelength characteristics at wavelengths shorter than the wavelength giving the first-order maximal value and with respect to the loss-wavelength characteristics at wavelengths longer than the wavelength giving the first-order maximal value, the loss-wavelength characteristics are asymmetrical with respect to the wavelength giving some maximal value in one period of FSR included in the wavelength giving this maximal value. As an example, in FIG. 2, one period of FSR included in the wavelength giving the second-order maximal value at wavelengths longer than the wavelength giving the first-order maximal value is shown.

Accordingly, if an asymmetrical portion from point a to point b shown in FIG. 2 is used as the loss-wavelength characteristics of a profile substantially identical with that of the input light intensity-wavelength characteristics shown in FIG. 1(a), loss-wavelength characteristics of a profile substantially identical with that of the input light intensity-wavelength characteristics can be obtained.

In order to cancel out the maximal value of the light intensity by the maximal value of loss, the wavelength giving the second-order maximal value in the loss-wavelength characteristics of the optical filter is brought nearly into coincidence with the wavelength giving the maximal value of the light intensity in the input light intensity-wavelength characteristics. In order to widen the equalized or aligned wavelength range, it is necessary to bring the maximal value of the light intensity substantially into agreement with the maximal value of loss in the loss-wavelength characteristics. This adjustment can be made by adjusting the refractive index of the FBG (fiber Bragg grating filter). Further, in order to achieve a profile identical with that of the input light intensity-wavelength characteristics, it is necessary to adjust the FSR of the loss-wavelength characteristics. This adjustment of the FSR can be made by adjusting the grading interval of the FBG. As a result, the optical equalizer can widen the equalized wavelength range.

Further, by adjusting the wavelength giving the maximal value of loss, the refractive index, and the FSR (free spectra range) in this way, an asymmetrical portion from point c to point d, an asymmetrical portion from point e to point f, and other portions can be used, as well as the asymmetrical portion from point a to point b shown in FIG. 2. Further, in a case where a wavelength range to be gain-equalized, the intensity-wavelength characteristic is a downwardly convex curve (i.e., in case where there is a minimal value of intensity), an asymmetrical portion from point g to point h and other portions can be used.

Such second and third order maximal values tend to appear more conspicuously in fiber Bragg grating filters (FBGs) having longer periods. Therefore, since it is easy to obtain loss-wavelength characteristics of a profile substantially identical with that of the input light intensity-wavelength characteristic, long-period fiber Bragg grating filters are preferable as optical filters.

Accordingly, in the first embodiment, since an asymmetrical portion of the loss-wavelength characteristics of an optical filter is used, the intensity of input light can be equalized over a wide wavelength range by one optical filter.

Especially in cases where an optical equalizer is incorporated into an optical amplifying apparatus, an amplified output whose gain curve is flat can be obtained over a wide wavelength range. In cases where it is applied to an optical transmission system, since the gain deviations arising from the loss-wavelength characteristics of the optical transmission path and from the gain-wavelength characteristics of the optical amplifier are leveled out, the gain deviations can be limited to within a given range even if ultra-long distance transmission is performed. Hence, the optical transmission system can accomplish ultra-long distance transmission.

Furthermore, in the first embodiment, since the gain can be equalized by a single optical filter, adjustment between plural optical filters which would normally be necessary in case where the gain is equalized by the plural optical filters is unnecessary.

In the first embodiment, since the gain can be equalized by a single optical filter, simple and cost-efficient optical equalizers, optical amplifying apparatuses, and optical transmission systems can be provided.

A second embodiment of the invention will now be described.

Figure 3:
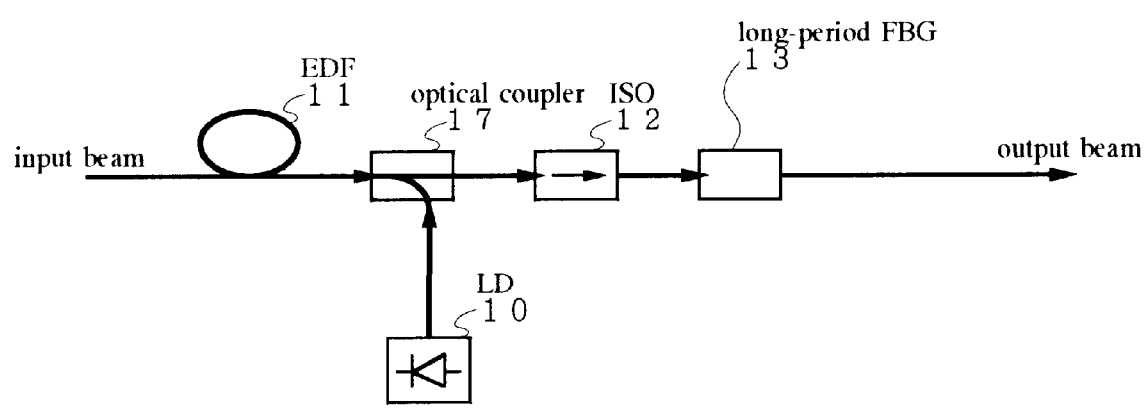
FIG. 3 is a diagram showing a structure of an optical amplifier in accordance with a second embodiment of the present invention.

In FIG. 3, laser beam of 1480-nm band oscillated by a laser diode (LD) 10 is inputted to an erbium-doped fiber (EDF) 11 through an optical coupler 17. The 1480-nm band is one of the absorption wavelength ranges of erbium element. It is known that erbium element has further absorption wavelength ranges such as 980 nm and 800 nm ranges. The erbium element is one of rare earth elements belonging to the lanthanide series, and is indicated by symbol Er and has an atomic number of 68. Elements belonging to the lanthanide series have mutually similar natures.

The erbium-doped fiber (EDF) 11 absorbs the laser beam emitted from the laser diode 10. The result is that electrons inside the erbium-doped fiber (EDF) 11 are excited, thereby generating an inverted population. Under this inverted population state, if input light is permitted to be inputted, stimulated emission occurs, thereby amplifying the input light.

The input beam is inputted from the end of the erbium-doped fiber 11 opposite to the end into which laser beam from the laser diode 10 is inputted. In cases where the direction of travel of the pump light is opposite to the direction of travel of the input light, it is referred to as backward pumping. Since the backward pumping attenuates as the pump light propagates through the erbium-doped fiber 11, it is an exciting method suitable for a case where the optical amplifying apparatus is used as a power amplifier obtaining large output.

The amplified input beam is inputted to an isolator (ISO) 12 that transmits light only in one direction through the coupler 17. The isolator 12 is connected downstream side of the EDF 11 (i.e., in the direction of propagation of the input beam) to prevent the erbium-doped fiber (EDF) 11 from being self-excited due to returning beam reflected at connected locations of optical components located downstream side of the EDF 11. It is preferable that the isolator 12 is of the non-polarization type to make effective use of the property of the gain of the fiber 11 (i.e., the gain does not depend on the plane of polarization).

The light outputted from the isolator 12 is inputted to a long-period fiber Bragg grating filter 13, where the gain is equalized and emitted as output light.

The operation and advantages of the second embodiment are described below.

Figure 4:
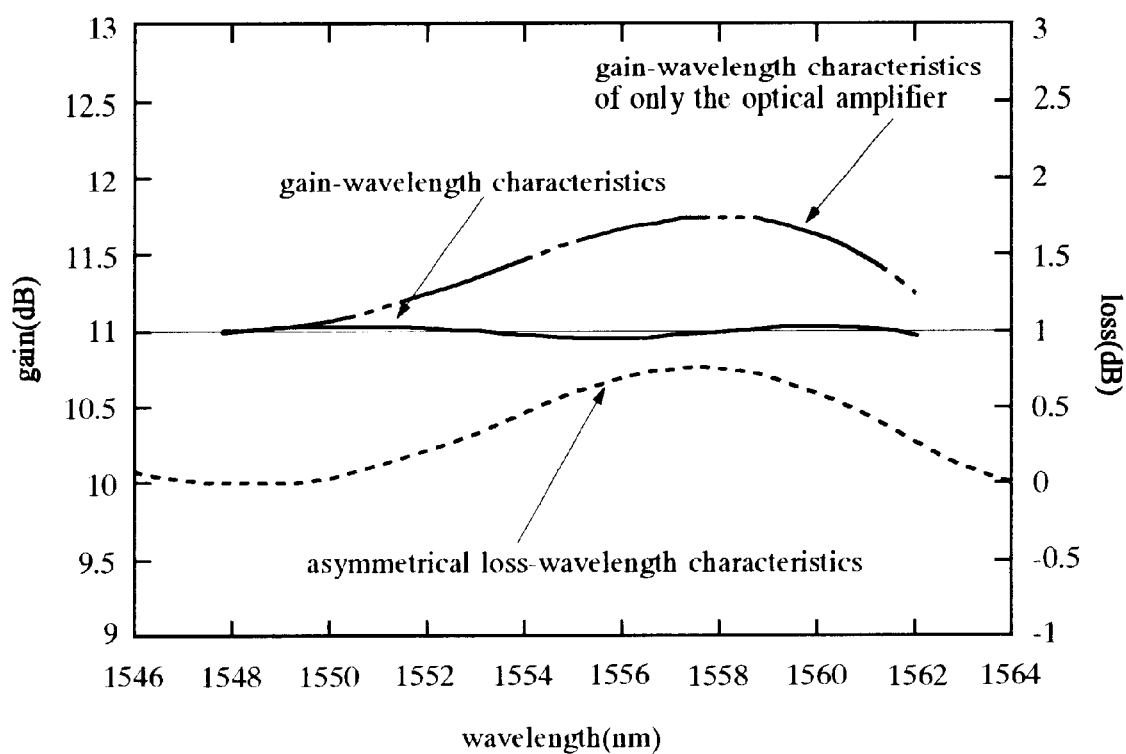
FIG. 4 is a diagram showing the outgoing light intensity-wavelength characteristics of an optical amplifier in accordance with the second embodiment.

As shown in FIG. 4, input beam is amplified by the erbium-doped fiber (EDF) 11, and outputted beam is obtained from the isolator 12. With respect to the gain-wavelength characteristics of the outputted beam from the isolator 12, the gain reaches its maximal value (approximately 11.7 dB) at a wavelength of about 1558 nm. The profile is asymmetrical with respect to this wavelength giving the maximal value.

The gain-wavelength characteristics of only the optical amplifier, which are indicated by the chain double-dashed lines in FIG. 4, are the gain-wavelength characteristics of beam outputted from the isolator 12 shown in FIG. 3. Plotted on the horizontal axis of FIG. 4 is wavelength in nm. Plotted on the left vertical axis is gain in dB regarding the gain-wavelength characteristics of only the optical amplifier. The right vertical axis indicates loss in dB regarding asymmetrical loss-wavelength characteristics.

The asymmetrical loss-wavelength characteristics indicated by the broken lines are loss-wavelength characteristics of only the long-period fiber Bragg grating filter 13 in FIG. 3.

It is known that the transmission wavelength characteristics T (λ) of the long-period fiber grating filter (FBG) 13 can be approximated by Eq. (1)

where α is the difference between the maximum loss and the minimum loss, $\lambda 0$ is the center wavelength giving the first-order maximal value, FSR is the period, and d is excess loss. Incidentally, since a transmittance of 100% corresponds to loss 0, the transmission-wavelength characteristics and the loss-wavelength characteristics can be made to correspond to each other in a 1:1 relation.

In order to equalize gain-wavelength characteristics by using one period of FSR included in a wavelength giving the second-order maximal value of the loss-wavelength characteristics of the long-period fiber Bragg grating filter 13, this filter 13 is designed with α=7 dB, $\lambda 0$=1580.6 nm, FSR=32.2 nm, and d=0.

A beam having the gain-wavelength characteristics indicated by the chain double-dashed lines is transmitted through the long-period fiber Bragg grating filter 13 having the loss-wavelength characteristics indicated by the broken lines, whereby the gain-wavelength characteristics are changed to the form indicated by the solid lines. Thus, the gain-wavelength characteristics are equalized. Therefore, the output beam from the optical amplifier has the equalized gain-wavelength characteristics as described above. The gain-wavelength characteristics have the equalized gain range that is an equalized wavelength range, which is from 1548 nm to 1562 nm.

Figure 5:
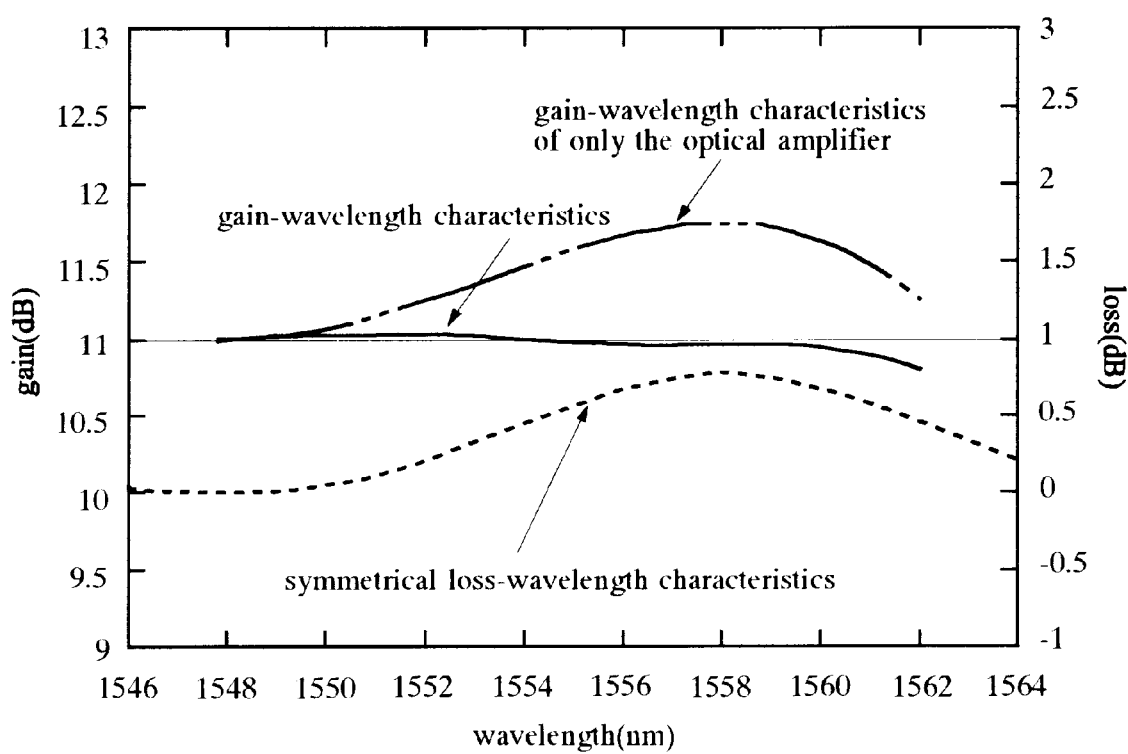
FIG. 5 is a diagram showing the manner in which gain-wavelength characteristics are equalized utilizing a symmetrical portion of loss-wavelength characteristics.

The advantages of the second embodiment are illustrated by referring to FIG. 5.

Referring to FIG. 5, gain equalization was performed using a symmetrical loss-wave characteristic region of the loss-wave characteristics of a long-period fiber Bragg grating filter, i.e., one period of free spectra range (FSR) included in a wavelength giving the first-order maximal value. In this case, a long-period fiber Bragg grating filter designed with α=0.77 dB, λ0=1558 nm, FSR=20 nm, and d=0 is used instead of the long-period fiber Bragg grating filter 13 shown in FIG. 3. The symmetrical loss-wavelength characteristics of the long-period fiber Bragg grating filter designed in this way are indicated by the broken line in FIG. 5.

In FIG. 5, the gain-wavelength characteristics of only an optical amplifier indicated by the chain double-dashed line have been taken from the gain-wavelength characteristics of only an optical amplifier indicated by the chain double-dashed line in FIG. 4, and indicate the gain-wavelength characteristics of beam outputted from the isolator 12 shown in FIG. 3. The axes of FIG. 5 are the same as their counterparts of FIG. 4.

As shown in FIG. 5, in cases where a beam outputted from the isolator 12 is equalized by using a symmetrical region of the loss-wavelength characteristics,: the equalized gain range is from 1548 nm to 1560 nm as indicated by the solid line.

Accordingly, rather in a case where a beam outputted from the isolator 12 is equalized by using an asymmetrical region of the loss-wavelength characteristics, a gain equalization range is widened by 2 nm toward the longer wavelength side in comparison with a case where the beam is equalized by using a symmetrical region of the loss-wavelength characteristics.

For example, in a case where 0.8 nm grid WDM optical signals are amplified in accordance with ITU-T recommendations by an optical amplifying apparatus in accordance with the second embodiment, WDM optical signals multiplexed with 2 or 3 more waves than prior art devices can amplify. Therefore, in case of an optical transmission system of 40 Gbit/s, the transmission capacity can be increased by as much as 80 to 120 Gbit/s.

In the optical amplifying apparatus of such a structure, stimulated emission is induced by the erbium-doped fiber (EDF) 11 in which an inverted population is generated by laser beam emitted from the laser diode 10, whereby the input beam is amplified. The amplified input beam is subjected to gain equalization by the long-period fiber Bragg grating filter 13 in a wide scope wavelength range from 1548 nm to 1562 nm, thereby becoming an output beam.

A third embodiment of the invention will now be described.

In the third embodiment, a WDM optical signal as an input beam is input into an optical amplifying apparatus, amplified so as to become a given output light intensity, and output.

Figure 6:
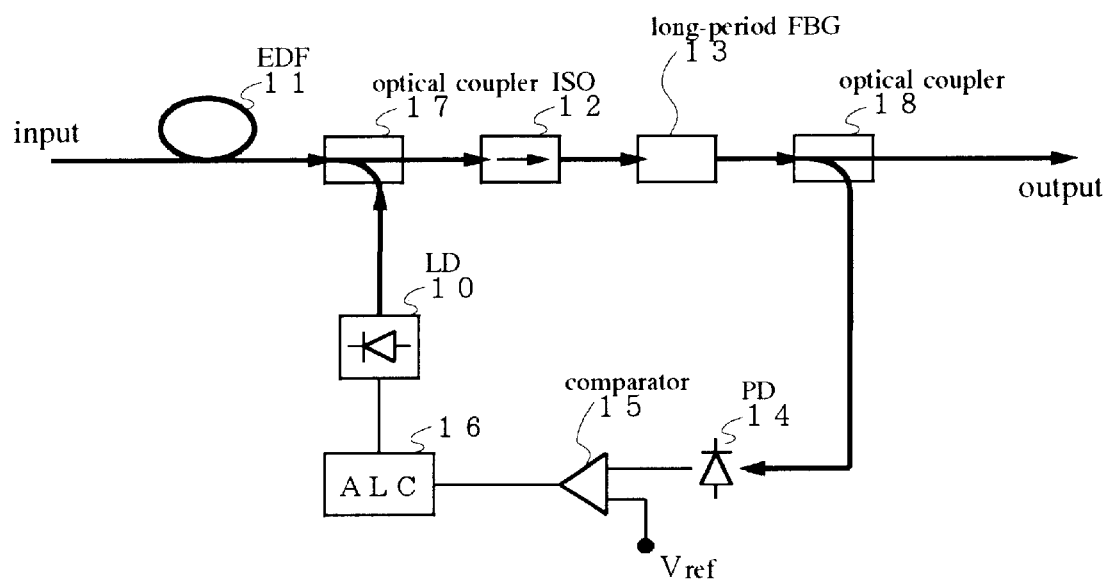
FIG. 6 is a diagram showing a structure of an optical amplifier in accordance with a third embodiment of the invention.

In FIG. 6, a laser beam of 1480-nm band from a laser diode (LD) 10 is inputted into an erbium-doped fiber (EDF) 11 through an optical coupler 17. The intensity of the laser beam is controlled by adjusting the driving current for the laser diode 10 on the basis of the signal outputted from an automatic level controller (ALC) 16 (to be described later).

The erbium-doped fiber (EDF) 11 amplifies a WDM optical signal inputted from the end on the opposite side of the end into which laser beam emitted from the laser diode 10 is inputted. The amplified WDM optical signal is inputted to a 1×2 coupler 18 through the coupler 17, isolator 12, and long-period fiber Bragg grating filter 13.

The WDM optical signal inputted into the coupler 18 is branched into two signals. One of the signals is outputted as an amplified WDM optical signal, while the other signal is inputted to a photodiode (PD) 14 and received thereby.

The photodiode 14 outputs a current proportional to the intensity of the beam received from the optical coupler 18 to a comparator 15. The comparator 15 converts the current from the photodiode 14 into a voltage by using a resistor (not shown in FIG. 6), and then compares the converted voltage with a reference voltage Vref. The comparator 15 outputs a signal proportional to the difference to the automatic level controller (ALC) 16. The controller 16 judges the intensity of the amplified WDM optical signal by the signal from the comparator 15, and adjusts the driving current for the laser diode 10 such that the light intensity becomes a given intensity.

In a case where the intensity of the WDM optical signal is the given intensity (e.g., 10 dBm), the reference voltage Vref is set to a voltage corresponding to the current outputted from the photodiode 14.

The feature of the third embodiment exists in a point that a feedback loop is added to the second embodiment. This feedback loop detects the intensity of a WDM optical signal that is equalized in gain after amplification and controls the intensity of the pump light from the laser diode 10. The feedback loop consists of an optical coupler 18, the photodiode (PD) 14, the comparator 15, and the automatic level controller (ALC) 16.

The operation and advantages of the third embodiment are described below.

In the optical amplifying apparatus of such a structure, an inverted population is generated inside the erbium-doped fiber (EDF) 11 by the laser beam from the laser diode 10. The WDM optical signal inputted to the EDF 11 induces stimulated emission and is amplified. The amplified WDM optical signal is equalized by the long-period fiber Bragg grating filter 13 and made to output.

Since the design values of the long-period fiber grating filter (FBG) 13 and the results of the gain equalization are the same as those of the second embodiment, they are not described.

If the intensity of the amplified WDM optical signal is judged to be greater or smaller than a given intensity of beam, a difference is produced between the output from the photodiode 14 and the reference voltage Vref. The automatic level controller (ALC) 16 can make a decision based on the output signal from the comparator 15 as to whether the intensity of the WDM optical signal is equal to the given intensity. The automatic level controller (ALC) 16 receives the output signal from the comparator 15 that corresponds to the difference, and adjusts the driving current for the laser diode 10. This adjustment varies the intensity of laser beam in 1480-nm band. According to this variation, the gain of the erbium-doped fiber (EDF) 11 can be adjusted.

Therefore, the relation between the driving current for the laser diode 10 and the gain of the erbium-doped fiber (EDF) 11 is previously examined. Based on this relation, the output value of the automatic level controller (ALC) 16 responsive to the output value from the comparator 15 is determined. In consequence, this optical amplifier can set the intensity of the gain-equalized WDM optical signal to a nearly desired value.

A fourth embodiment of the invention will now be described.

An optical amplifying apparatus in accordance with the fourth embodiment is inputted a WDM optical signal as input light, amplifies it so as to become a desired gain, and outputs the amplified optical signal.

Figure 7:
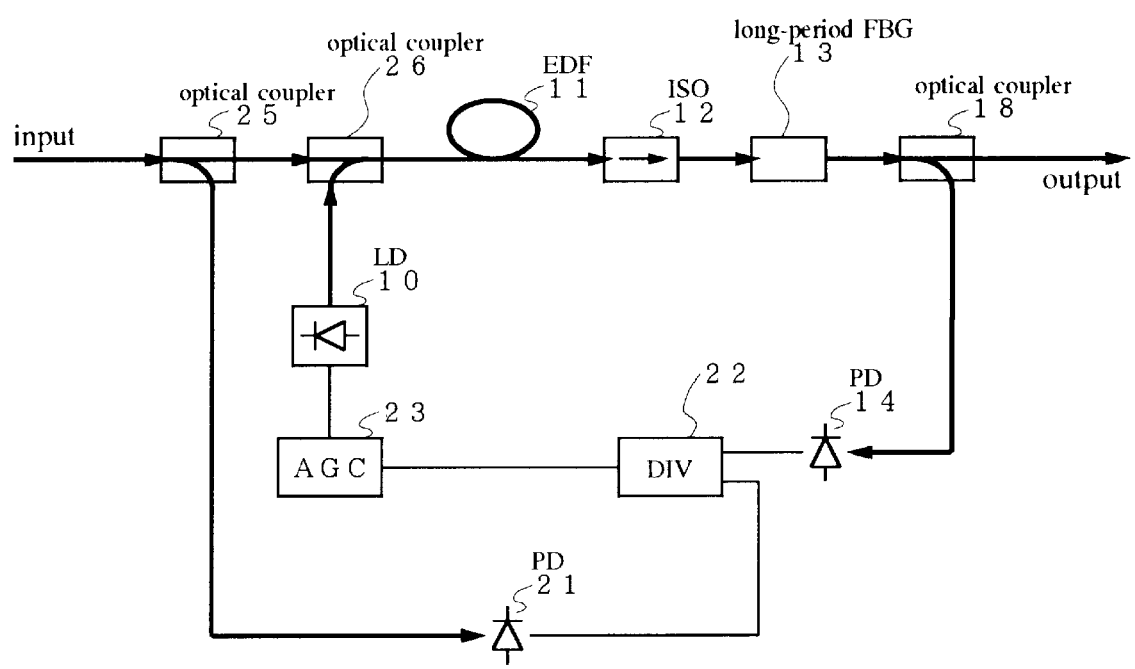
FIG. 7 is a diagram showing a structure of an optical amplifier in accordance with a fourth embodiment of the invention.

In FIG. 7, a laser beam in the 1480-nm band from the laser diode 10 is inputted into a 2×1 coupler 26. The intensity of this laser beam is controlled by adjusting the driving current for the laser diode 10 on the basis of the signal from an automatic gain controller (AGC) 23 (to be described later).

The laser beam inputted to the coupler 26 is combined by this coupler 26 with the WDM optical signal that is inputted through a 1×2 coupler 25. The resulting light is emitted to the erbium-doped fiber (EDF) 11.

In this way, in a case where the direction of travel of the pump light is the same as the direction of travel of the input light (WDM optical signal), it is referred to as forward pumping. The forward pumping is an excitation method suitable for a case where the optical amplifying apparatus is used as a preamplifier, because the noise figure is smaller in comparison with backward pumping. Since the magnitude of the inverted population varies along the direction of propagation, the noise figure differs depending on the length of the erbium-doped fiber (EDF) and on the direction of pumping. In the case of forward pumping, since there is a high population inversion at the input side of the erbium-doped fiber (EDF) on which the WDM optical signal is inputted, the WDM optical signal is amplified under a state of good noise figure. On the other hand, in a case of backward pumping, since there is a high population inversion at the output side of the erbium-doped fiber (EDF), the signal is amplified under a state that the noise figure is deteriorated by shot noise due to amplified spontaneous emission and other noises. For this reason, the forward pumping has better noise figure in comparison with the noise figure produced in case of backward pumping.

The optical coupler 25 branches the WDM optical signals into two parts to detect the intensity of the inputted WDM optical signal. One of the two beams branched by the coupler 25 is inputted to the coupler 26, while the other part is inputted to the photodiode 21 that outputs a current responding to the intensity of the received beam.

The WDM optical signal amplified by the erbium-doped fiber (EDF) 11 is inputted to the 1×2 coupler 18 through the isolator 12 and the long-period fiber Bragg grating filter (FBG) 13.

The WDM optical signal impinging on the coupler 18 is branched into two parts. One of these parts is outputted as an amplified WDM optical signal, and the other part is inputted to the photodiode 14, and received thereby.

The photodiode 14 outputs a current proportional to the intensity of beam from the coupler 18 to a divider (DIV) 22. The divider 22 converts the currents from the photodiode 14 and 21 into their respective voltages by using resistors (not shown in FIG. 7). The divider 22 divides a voltage on the basis of photodiode 14 by a voltage based on the photodiode 21 and sends a signal corresponding to the result to the AGC 23. The AGC 23 judges the gain of the amplified WDM optical signal relative to the unamplified WDM optical signal, based on the output signal from the divider 22. The AGC 23 adjusts the driving current for the laser diode 10 such that the gain becomes a desired value.

Note that in the fourth embodiment, a feedback loop is added to the second embodiment. This feedback loop detects the intensity of the unamplified WDM optical signal and the intensity of the amplified gain-equalized WDM optical signal and controls the intensity of the pump light from the laser diode (LD) 10. This feedback loop is composed of the optical coupler 25, the photodiode 21, the optical coupler 18, the photodiode 14, the divider 22, and the AGC 23.

The operation and advantages of the fourth embodiment are described below.

In the optical amplifying apparatus of the fourth embodiment, an inverted population generated inside the erbium-doped fiber (EDF) 11 by the laser beam from the laser diode 10. The WDM optical signal inputted to the EDF 11 induces stimulated emission and is amplified. The amplified WDM optical signal is equalized by the long-period fiber Bragg grating filter 13 and is outputted.

Since the design values of the long-period fiber Bragg grating filter 13 and the results of the gain equalization are the same as those of the second embodiment, they are not described.

Meanwhile, the divider 22 calculates the ratio of the intensity of the amplified WDM optical signal before being amplified to the intensity of amplified WDM optical signal, and outputs a signal corresponding to this ratio to the AGC 23. Therefore, the AGC 23 can judge the gain of the optical amplifier. The AGC 23 receives a signal corresponding to the ratio from the divider 22 and adjusts the driving current for the laser diode 10 such that the ratio becomes a desired constant value.

This adjustment varies the intensity of laser beam in 1480-nm band. According to this variation, the gain of the erbium-doped fiber (EDF) 11 can be adjusted.

Therefore, the relation between the driving current for the laser diode 10 and the gain of the erbium-doped fiber (EDF) 11 is previously examined. Based on this relation, the output value of the automatic gain controller (AGC) 23 responsive to the output value from the divider 22 is determined. In consequence, this optical amplifier can set the gain of the gain-equalized WDM optical signal to a nearly desired value.

In case where the ratio of the intensity of amplified WDM optical signal to the intensity of the unamplified WDM optical signal is a desired gain (e.g., 10 dB), a value to be outputted from the divider 22 is previously found, and the desired constant value is set to this previously found value.

A fifth embodiment of the invention will now be described.

An optical amplifier in accordance with the fifth embodiment is used as an optical repeater for an optical communication system providing bi-directional optical communication. This amplifier receives up and down WDM optical signals as input light and amplifies the up and down WDM optical signals separately so they can become a desired magnitude.

Figure 8:
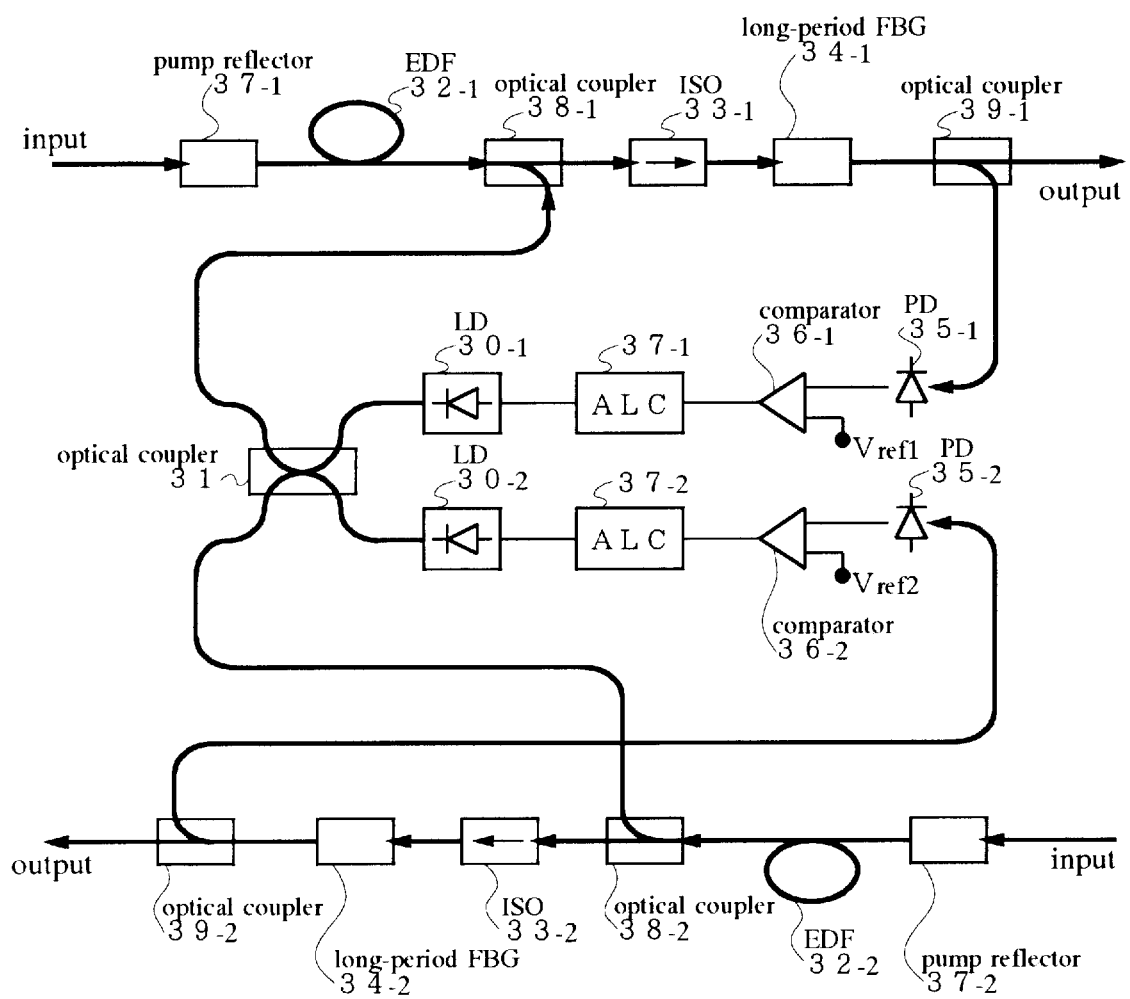
FIG. 8 is a diagram showing a structure of an optical amplifier in accordance with a fifth embodiment of the invention.

Referring now to FIG. 8, a laser beam in the 1480-nm band emitted by a laser diode 30-1 is inputted to a 2×2 optical coupler 31. The intensity of the laser beam emitted from the laser diode 30-1 is controlled by adjusting the driving current for the laser diode 30-1 on the basis of the output from an automatic level controller (ALC) 37-1.

The laser beam in 1480-nm band emitted by a laser diode 30-2 is inputted into a 2×2 optical coupler 31. The intensity of the laser beam emitted from the laser diode 30-2 is controlled by adjusting the driving current for the laser diode 30-2 on the basis of the output from an automatic level controller (ALC) 37-2.

The optical coupler 31 combines as it maintains polarization on the laser beam from the laser diodes 30-1 and 30-2 and branches the combined laser beam into two. The polarization-combined laser beam emitted from the coupler 31 can supply the polarization-independent laser beam to erbium-doped fibers (EDFs) 32-1 and 32-2.

One of the two parts of the laser beam branched by the coupler 31 is supplied to the erbium-doped fiber (EDF) 32-1 through a coupler 38-1, and becomes pump light that amplifies the up direction WDM optical signal.

The other laser beam branched by the coupler 31 is supplied to the erbium-doped fiber (EDF) 32-2 through a coupler 38-2, and becomes pump light that amplifies the down direction WDM optical signal.

Since the structure for amplifying the up direction WDM optical signal is the same as the structure for amplifying the down direction WDM optical signal, the structure for amplifying the up direction WDM optical signal will hereinafter be described. For the structure for amplifying the down direction WDM optical signal, corresponding components or structures are indicated by corresponding numerals or symbols in parentheses and will not be described. In case of the structure for down direction, the up direction WDM optical signal should be read as the down direction WDM optical signal.

The erbium-doped fiber (EDF) 32-1 (32-2) absorbs the laser beam from the coupler 31, the light being inputted through the coupler 38-1 (38-2), thus exciting electrons inside the erbium-doped fiber (EDF) 32-1 (32-2). As a result, an inverted population is generated inside the erbium-doped fiber (EDF) 32-1 (32-2). Under this state, if an up WDM optical signal is inputted through a pump reflector 37-1 (37-2), stimulated emission takes place, thereby amplifying the up WDM optical signal.

The pump reflector 37-1 (37-2) is a reflection-type optical filter having a reflection range in 1480-nm band. The pump reflector 37-1 (37-2) reflects leakage pump light that is outputted from the erbium-doped fiber (EDF) 32-1 (32-2) without being consumed to invert the population in the erbium-doped fiber (EDF) 32-1 (32-2). The pump reflector 37-1 (37-2) returns the leakage pump light into the erbium-doped fiber (EDF) 32-1 (32-2), and the light is consumed to generate a population inversion in the erbium-doped fiber (EDF) 32-1 (32-2). Consequently, the optical amplifying apparatus equipped with the pump reflector can reduce a waste of the pump light. Since the pump reflector 37-1 (37-2) is located in the path along which the up direction WDM optical signal propagates, it is necessary to set the signal range of the up direction WDM optical signal outside the reflection range of the pump reflector 37-1 (37-2).

The up direction WDM optical signal amplified by the erbium-doped fiber (EDF) 32-1 (32-2) is inputted into the 1×2 coupler 39-1 (39-2) through the coupler 38-1 (38-2), through an optical isolator 33-1 (33-2) for transmitting a light only in one direction, and through a long-period fiber Bragg grating filter 34-1 (34-2) for equalizing the gain.

The inputted up direction WDM optical signal is branched into two. One is made to output as an amplified up direction WDM optical signal, while the other is inputted to a photodiode 35-1 (35-2) and is received thereby.

The photodiode 35-1(35-2) outputs a current proportional to the intensity of beam received from the optical coupler 39-1(39-2) to a comparator 36-1(36-2). The comparator 36-1(36-2) converts the current from the photodiode 35-1 (35-2) into a voltage by using a resistor (not shown in FIG. 8), and then compares the converted voltage with a reference voltage Vref1 (a reference voltage Vref2). The comparator 36-1(36-2) outputs a signal proportional to this difference to the automatic level controller (ALC) 37-1(37-2). The controller 37-1(37-2) judges the intensity of the amplified up direction WDM optical signal by the signal from the comparator 36-1(36-2), and adjusts the driving current for the laser diode 30-1(30-2) such that the light intensity becomes a given intensity.

In cases where the intensity of the up direction WDM optical signal is the given intensity (e.g., 10 dBm), the reference voltage Vref1 (Vref2) is set to a voltage corresponding to the current outputted from the photodiode 35-1(35-2).

The operation and advantages of the fifth embodiment are described below.

In the optical amplifying apparatus of the fifth embodiment, an inverted population is generated inside the erbium-doped fiber (EDF) 32-1, 32-2 by the laser beam from the laser diode 30-1, 30-2. The up direction WDM optical signal inputted to the EDF 32-1 induces stimulated emission and is amplified. The amplified up direction WDM optical signal is equalized by the long-period fiber Bragg grating filter 34-1 and is outputted. The down direction WDM optical signal inputted to the EDF 32-2 induces stimulated emission and is amplified. The amplified up direction WDM optical signal is equalized by the long-period fiber Bragg grating filter 34-2 and is outputted.

The long-period fiber Bragg grating filter 34-1 has $\alpha$, $\lambda 0$, FSR, and d which are designed according to Eq. (1) on the basis of gain-wavelength characteristics of an optical amplifier consisting of laser diode 30-1, optical coupler 31, an optical coupler 38-1, erbium-doped fiber (EDF) 32-1, pump reflector 37-1, and isolator 33-1, in the same way as in the second embodiment. Another long-period fiber Bragg grating filter 34-2 is similarly designed.

On the other hand, if the intensity of the amplified up direction WDM optical signal is judged to be greater or smaller than a given intensity of beam, a difference is produced between the output from the photodiode 35-1 and the reference voltage Vref1. The automatic level controller (ALC) 37-1 can make a decision based on the output signal from the comparator 36-1 as to whether the intensity of the up direction WDM optical signal is equal to the given intensity. The automatic level controller (ALC) 37-1 receives the output signal from the comparator 36-1 that corresponds to the difference, and adjusts the driving current for the laser diode 30-1. This adjustment varies the intensity of laser beam in 1480-nm band. According to this variation, the gain of the erbium-doped fiber (EDF) 32-1 can be adjusted.

Therefore, the relation between the driving current for the laser diode 30-1 and the gain of the erbium-doped fiber (EDF) 32-1 is previously examined. Based on this relation, the output value of the automatic level controller (ALC) 37-1 responsive to the output value from the comparator 36-1 is determined. In consequence, this optical amplifier can set the intensity of the gain-equalized up direction WDM optical signal to a nearly desired value.

Furthermore, the relation between the driving current for the laser diode 30-2 and the gain of the erbium-doped fiber (EDF) 32-2 is previously examined. Based on this relation, the output value of the automatic level controller (ALC) 37-2 responsive to the output value from the comparator 36-2 is determined. In consequence, this optical amplifier can set the intensity of the gain-equalized down direction WDM optical signal to a nearly desired value.

In the fifth embodiment, it has been described about a case where the laser diodes 30-1 and 30-2 are identical in oscillation wavelength. However, since the erbium-doped fibers (EDFs) 32-1 and 32-2 have gain-wavelength characteristics that vary according to the wavelength of pump light, there is a case where the oscillation wavelengths of the laser diodes 30-1 and 30-2 are made different according to the application of the optical amplifier. In this case, the coupler 31 is replaced by an optical multiplexer that wavelength-multiplexes laser beam from the laser diodes 30-1 and 30-2 and branches the multiplexed laser beam into two. In the second through fifth embodiments, erbium-doped fibers are used, but the invention is not limited to this. Optical fibers doped with other rare earth elements may also be used. For instance, optical fibers doped with neodymium, praseodymium, or thulium may also be employed.

The neodymium element is indicated by symbol Nd and has an atomic number of 60. Neodymium is doped in an optical fiber to amplify light in 1300 nm band.

The praseodymium element is indicated by symbol Pr and has an atomic number of 59. Praseodymium is doped in an optical fiber to amplify light in 1300 nm band.

The thulium element is indicated by symbol Tm and has an atomic number of 69. Praseodymium element is doped in an optical fiber to amplify light in 1450 nm band.

In the above cases, the long-period fiber Bragg grating filters have $\alpha$, $\lambda 0$, FSR, and d which are designed according to Eq. (1) in order to match the loss-wavelength characteristics of the long-period fiber Bragg grading filters to the gain-wavelength characteristics in the respective optical amplifiers.

In the second, third, and fifth embodiments, cases of backward pumping have been described, but forward pumping may also be used. In the fourth embodiment, cases of forward pumping have been described, but backward pumping may also be used. In the second through fifth embodiments, plural pump sources for generating pump light may be used to thereby accomplish bi-directional pumping in which pump light rays are inputted from both sides of an optical fiber for amplifying light.

In the second through fifth embodiments, a so-called rare earth element-doped optical fiber amplifier is used as means for amplifying light, but the invention is not limited to this. Nonlinear fiber amplifiers making use of nonlinear scattering of optical fiber such as stimulated Raman scattering and stimulated Brillouin scattering and other means for amplifying light such as semiconductor laser amplifiers (such as injection-locking type, Fabry-Perot-resonating type, and traveling-wave type) can also be used. Semiconductor laser amplifiers have excellent characteristics such as compactness, low power consumption, and good matching to optical integrated circuits.

A sixth embodiment of the invention will now be described.

Figure 9:
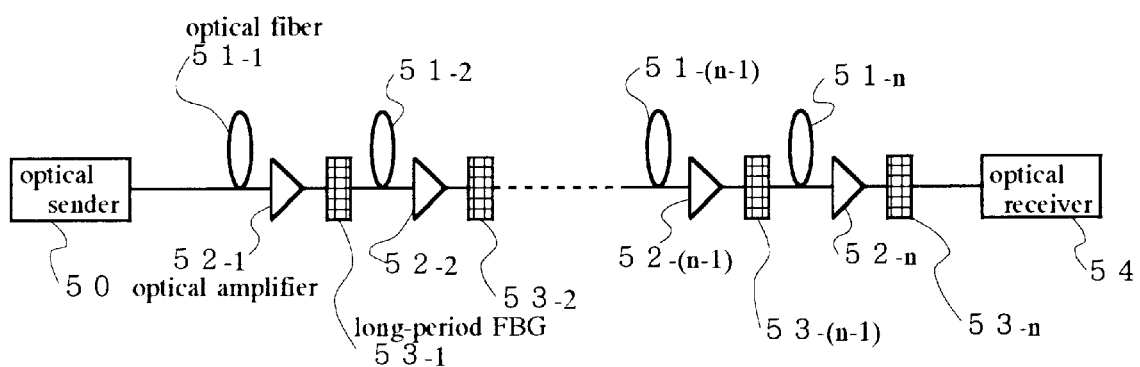
FIG. 9 is a diagram showing a first structure example of an optical transmission system using an optical equalizer, the system being built in accordance with a sixth embodiment.

In FIG. 9, a WDM optical signal outputted from an optical sender 50 is inputted to an optical fiber 51-1 that is an optical transmission line. The optical sender 50 modulates beam according to information to be transmitted, thereby creating an optical signal for each channel. The optical sender 50 wavelength-multiplexes the optical signals for channels, thereby generating a WDM optical signal.

The WDM optical signal transmitted through the optical fiber 51-1 is inputted to an optical amplifier 52-1, which amplifies the WDM optical signal that has been attenuated during propagation through the optical fiber 51-1. Then, the amplified WDM optical signal is passed into a long-period fiber Bragg grating filter 53-1, which equalizes the light intensity-wavelength characteristics of the amplified WDM optical signal.

The long-period fiber Bragg grating filter 53-1 has $\alpha$, $\lambda 0$, FSR, and d designed according to Eq. (1) in order to match the loss-wavelength characteristics of the long-period fiber Bragg grating filter 53-1 to the light intensity-wavelength characteristics of a WDM optical signal to be inputted.

If the optical fiber 51-1, the optical amplifier 52-1, and the long-period fiber grating filter (FBG) 53-1 are taken as one transmission unit, the equalized WDM optical signal is made to impinge on the optical fiber 51-2, which is a next transmission unit. Subsequently, transmission, amplification, and equalization are repeated. The WDM optical signal outputted from the long-period fiber grating filter (FBG) 53-n of the nth transmission unit is inputted to an optical receiver 54.

The optical receiver 54 branches the WDM optical signal into the respective channels. The branched optical signals are demodulated, thereby extracting the original information.

In this optical transmission system, whenever the WDM optical signal is relayed by one optical amplifier (any one of 11-1 through 11-n), the WDM optical signal can be equalized by one of the long-period fiber Bragg grating filters 53-1 through 53-n.

In the above-described structure of FIG. 9, whenever the WDM optical signal is amplified by the optical amplifier, the amplified WDM optical signal is equalized. However, as shown in FIG. 10, the amplified WDM optical signal may be equalized after the signal is amplified by plural optical amplifying apparatuses.

Figure 10:
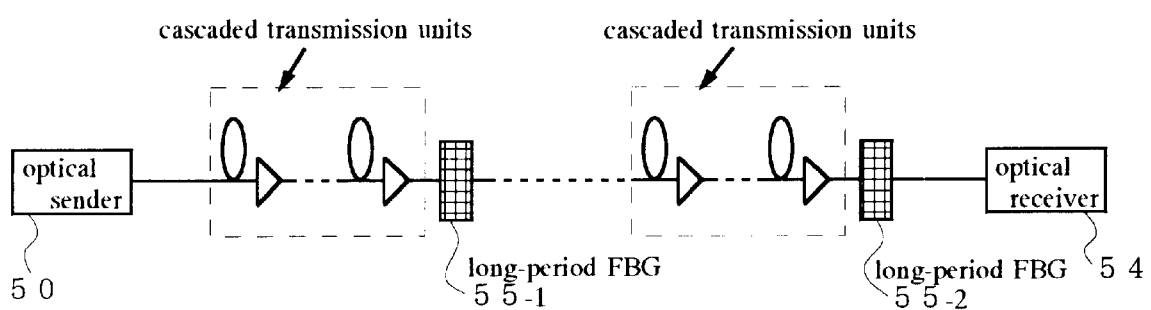
FIG. 10 is a diagram showing a second structure example of an optical transmission system using an optical equalizer, the system being built in accordance with the sixth embodiment.

In the structural example of the optical transmission system shown in FIG. 10, if an optical fiber and an optical amplifier are taken as one transmission unit, long-period fiber Bragg grating filters 55-1 and 55-2 that are optical equalizers are arranged at appropriate relay intervals between the n cascaded transmission units.

In this optical transmission system, the long-period fiber Bragg grating filters 55-1 and 55-2 can integrally equalize the WDM optical signal relayed through plural optical amplifiers.

A seventh embodiment of the invention will now be described.

Figure 11:
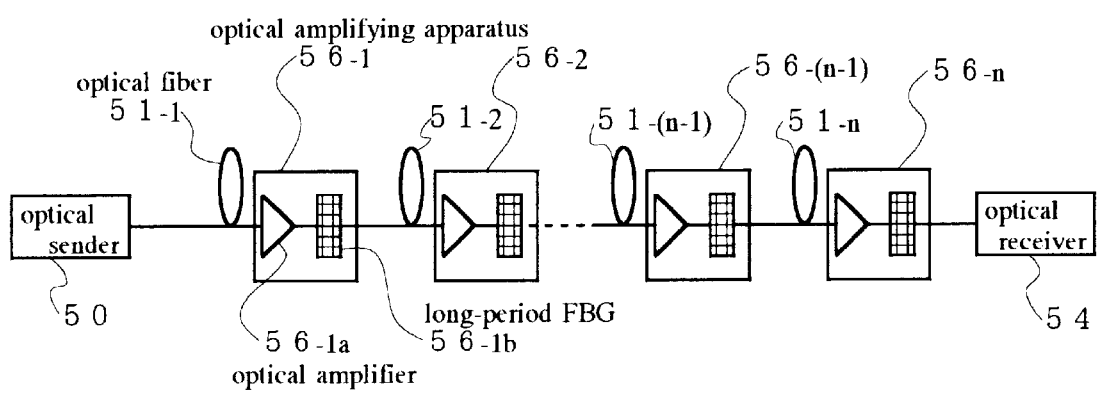
FIG. 11 is a diagram showing a first structure of an optical transmission system using an optical equalizer, the system being built in accordance with a seventh embodiment.

In FIG. 11, a WDM optical signal outputted from an optical sender 50 is inputted into an optical fiber 51-1 that is an optical transmission line. The WDM optical signal transmitted through the optical fiber 51-1 is inputted into an optical amplifying apparatus 56-1.

The optical amplifying apparatus 56-1 comprises an optical amplifier 56-1$a$ which in turn amplifies the WDM optical signal that has been attenuated during propagation through the optical fiber 51-1, and a long-period fiber Bragg filter 56-1$b$ which in turn equalizes the gain-wavelength characteristics of the amplified WDM optical signal.

The long-period fiber Bragg grating filter 56-1$b$ has $\alpha$, $\lambda 0$, FSR, and d designed according to Eq. (1) in order to match the loss-wavelength characteristics of the long-period fiber Bragg grating filter 56-1$b$ to the gain-wavelength characteristics of the optical amplifier 56-1$a$.

If the optical fiber 51-1 and the optical amplifying apparatus 56-1 are taken as one transmission unit, the WDM optical signal that is equalized after amplified by the optical amplifying apparatus 56-1 is made to input into the optical fiber 51-2, which is a next transmission unit. Subsequently, transmission, amplification, and equalization are repeated. The WDM optical signal emitted from the optical amplifying 56-n of the nth transmission unit is made to input into the optical receiver 54.

The operation and advantages of a seventh embodiment of the present invention are described below.

The optical transmission system of the seventh embodiment is able to amplify and equalize the WDM optical signal by the optical amplifying apparatus 56-1 to 56-n that are repeaters at regular intervals along the optical fibers 51-1 to 51-n.

In the aforementioned structure of FIG. 11, the WDM optical signal is amplified and equalized by all the optical amplifying apparatus 56-1 to 56-n. However, as shown in FIG. 12, the WDM optical signal may be equalized after amplifying the signal by plural optical amplifiers having no gain-equalizing function in accordance with the present invention.

Figure 12:
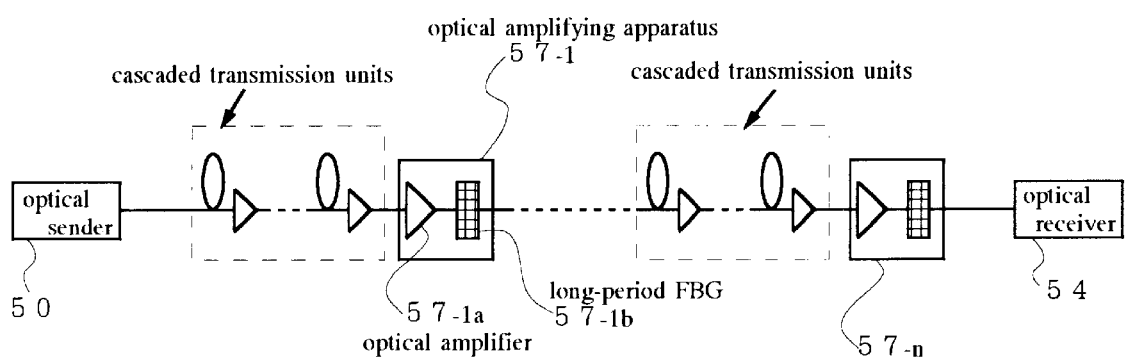
FIG. 12 is a diagram showing a second structure of an optical transmission system using an optical equalizer, the system being built in accordance with the seventh embodiment.
Figure 13:
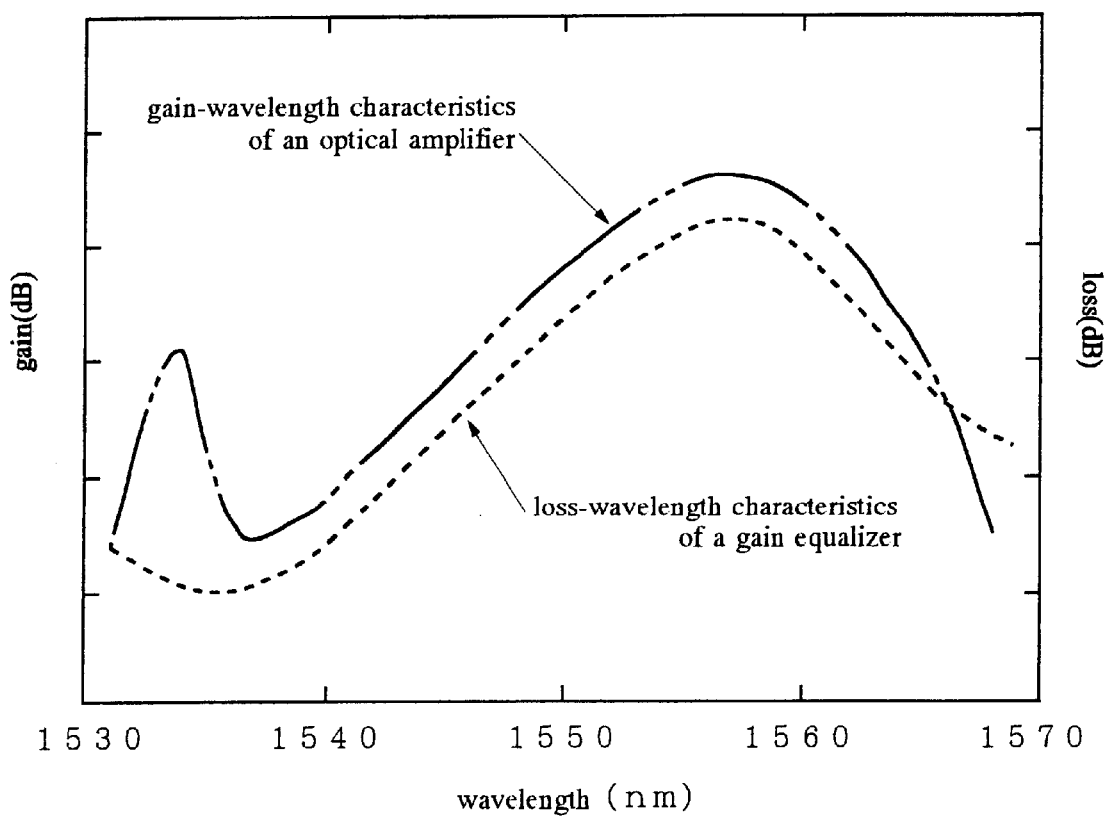
FIG. 13 is a diagram showing the gain-wavelength characteristics of an optical amplifier and the loss-wavelength characteristics of the prior art optical equalizer.

In the structural example of this optical transmission system shown in FIG. 12, if an optical fiber and an optical amplifier having no gain-equalizing function in accordance with the present invention are taken as one transmission unit, optical amplifying apparatus 57-1 and 57-2 having gain-equalizing function in accordance with the present invention are located at appropriate relay intervals between the n cascaded transmission units.

In this optical transmission system, the optical amplifying apparatus 57-1 and 57-2 can integrally equalize the WDM optical signal after it is relayed through plural optical amplifiers.

The invention is not limited to the above embodiments and various modifications are possible without departing from the spirit and scope of the invention. Any improvements may be made in part or all of the components.

What is claimed is:

1. A gain equalizing method comprising:

approximately flattening -a curve of light-intensity as a wavelength characteristic of inputted light within a predetermined bandwidth of wavelengths before outputting an inputted light;

using a part in a loss of an optical filter as a wavelength characteristic in which the part is asymmetrical to a wavelength which gives a peak value of the loss; and approximately aligning said wavelength which gives a peak value of the loss with a wavelength which gives a peak value of light intensity, in said light-intensity as a wavelength characteristic within said predetermined bandwidth of wavelengths.

2. A gain equalizing method according to claim 1, wherein a peak value of said loss is a maximal value, and a peak value within said predetermined bandwidth of a wavelength of said light intensity as a wavelength characteristic is a maximal value.

3. A gain equalizing method according to claim 1, wherein:

a peak value of said loss is a maximal value on a side of short wavelengths in correspondence to a wavelength which gives a first order of maximal value of a loss, a peak value within said predetermined bandwidth of a wavelength of said light intensity as a wavelength characteristic is a maximal value, and said optical filter is an optical fiber Bragg grating filter.

4. A gain equalizing method according to claim 1, wherein:

a peak value of said loss is a maximal value on the side of long wavelengths in correspondence to a wavelength which gives the first order of maximal value of a loss, a peak value within said predetermined bandwidth of a wavelength of said light intensity as a wavelength characteristic is a maximal value, and said optical filter is an optical fiber Bragg grating filter.

5. An optical equalizer for equalizing gain-wavelength characteristics of an optical amplifier, comprising:

an optical filter having a plurality of peak values of loss-wavelength characteristics and a loss-wavelength characteristic curve asymmetrical within a predetermined bandwidth, wherein said predetermined bandwidth of said optical filter is aligned to a bandwidth corresponding to a gain-wavelength characteristics of said optical filter.

6. An optical amplifying apparatus comprising:

an optical amplifier amplifying light and having gain-wavelength characteristics with one peak value; and an optical filter filtering the amplified light and having a plurality of peak values of loss-wavelength characteristics and a loss-wavelength characteristic curve asymmetrical within a predetermined bandwidth, wherein said predetermined bandwidth of said optical filter is aligned to a bandwidth corresponding to the gain-wavelength characteristics of said optical filter.

7. An optical amplifying apparatus according to claim 6, wherein said optical filter is an optical fiber Bragg grating filter having set a part of its loss as a wavelength characteristic on a side of shorter wavelengths relative to other wavelengths corresponding to a wavelength which gives the first maximal value of a loss to said predetermined bandwidth of a wavelength.

8. An optical amplifying apparatus according to claim 6, wherein said optical filter is an optical fiber Bragg grating filter having set a part of its loss as a wavelength characteristic on the side of longer wavelengths relative to other wavelengths corresponding to a wavelength which gives the first maximal value of a loss to said predetermined bandwidth of a wavelength.

9. An optical amplifying apparatus according to claim 6, further comprising a level controlling unit controlling light-intensity of light outputted from said optical amplifier in accordance to light-intensity of outputted light from the optical amplifying apparatus.

10. An optical amplifying apparatus according to claim 6, further comprising a gain controlling unit controlling gain of said optical amplifier to a constant level in accordance to the light-intensity of outputted light from the optical amplifying apparatus.

11. An optical amplifying apparatus according to claim 6, wherein said optical amplifier comprises an optical fiber doped with a rare-earth element and a pump source generating a pump light which excites said optical fiber.

12. An optical amplifying apparatus according to claim 11, further comprising a reflection type optical filter connected to an end opposite the end of said optical fiber, wherein light from said pump source is inputted, and set a reflection bandwidth to a wavelength of said pump light.

13. An optical amplifying apparatus according to claim 11, wherein said pump source is a pump source of a redundant structure and comprises:

a plurality of light sources; and a combining unit polarizing-combining light from said plurality of light sources and supplying the polarized-combined light to said optical fiber.

14. An optical amplifying apparatus according to claim 11, wherein said pump source is a pump source of a redundant structure and comprises:

a plurality of light sources; and a multiplexing unit wavelength-multiplexing light from said plurality of light sources and supplying the wavelength-multiplexed light to said optical fiber.

15. An optical transmission system comprising:

an optical transmission line transmitting light;

an optical amplifying apparatus amplifying light transmitted through said optical transmission line; and an optical equalizer capable of insertion anywhere in said optical transmission line, wherein said optical equalizer comprises an optical filter having a plurality of a peak values of loss-wavelength characteristics and a loss-wavelength characteristic curve asymmetrical within a predetermined bandwidth and aligns said predetermined bandwidth of said optical filter to a bandwidth corresponding to the gain-wavelength characteristics of said optical filter.

16. An optical transmission system comprising an optical transmission line transmitting light and an optical amplifying apparatus amplifying light transmitting through said optical transmission line, wherein said optical amplifying apparatus comprises:

an optical amplifier amplifying light and having gain-wavelength characteristics with one peak value; and an optical filter filtering the amplified light and having a plurality of peak values of loss-wavelength characteristics and a loss-wavelength characteristic curve asymmetrical within a predetermined bandwidth, wherein said predetermined bandwidth of said optical filter is aligned to a bandwidth corresponding to the gain-wavelength characteristics of said optical filter.

* * * * *

UNITED STATES PATENT AND TRADEMARK OFFICE
CERTIFICATE OF CORRECTION

PATENT NO. : 6,417,960 B1
DATED : July 9, 2002
INVENTOR(S) : Naomasa Shimojoh

It is certified that error appears in the above-identified patent and that said Letters Patent is hereby corrected as shown below:

<u>Title page,</u>
Item [56], OTHER PUBLICATIONS, change "TEchnical" to -- Technical --.

<u>Column 17,</u>
Line 31, change "-a" to -- a --.

Signed and Sealed this

Third Day of December, 2002

JAMES E. ROGAN
*Director of the United States Patent and Trademark Office*